A. L. JOYNES.
MOISTURE PROOF CASE FOR INSULATED WIRES.
APPLICATION FILED JUNE 4, 1906.
900,382.
Patented Oct. 6, 1908.
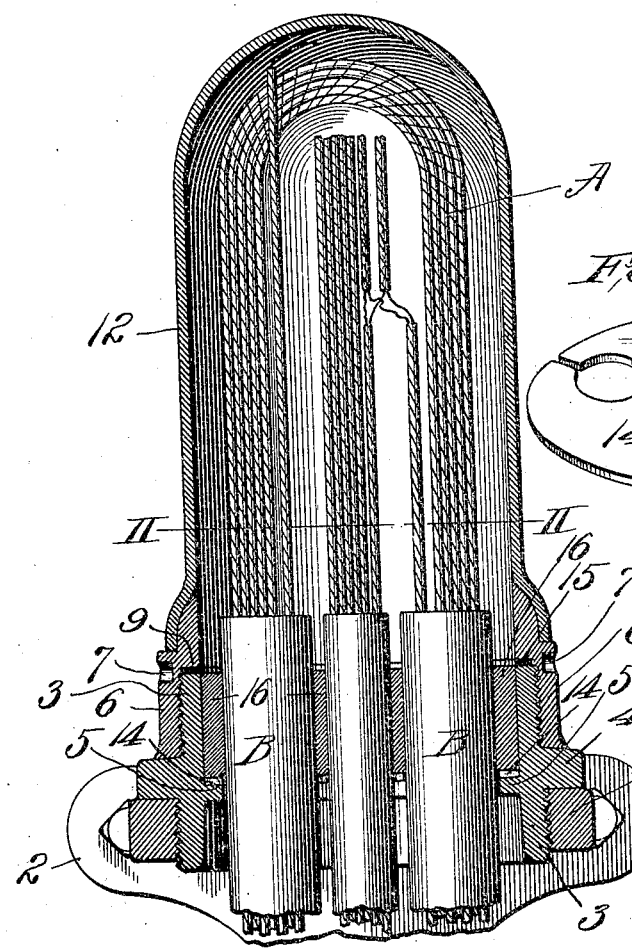
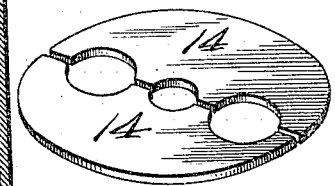

UNITED STATES PATENT OFFICE.

ADRIAN L. JOYNES, OF PADUCAH, KENTUCKY, ASSIGNOR OF ONE-THIRD TO CHARLES L. MEYERS, OF ST. LOUIS, MISSOURI.

MOISTURE-PROOF CASE FOR INSULATED WIRES.

No. 900,382.　　　Specification of Letters Patent.　　　Patented Oct. 6, 1908.

Application filed June 4, 1906. Serial No. 320,004.

*To all whom it may concern:*

Be it known that I, ADRIAN LEO JOYNES, a citizen of the United States, residing in Paducah, in the county of McCracken and State of Kentucky, have invented certain new and useful Improvements in Moisture-Proof Cases for Insulated Wires, of which the following is a full, clear, and exact description, reference being had to the accompanying drawings, forming part of this specification.

My invention relates to moisture-proof outlet cases for covering parts of cables of electrical conducting wires where the lead armor has been removed or is absent thereby leaving the wires exposed, and part or all of the wires are spliced, and has for its object to provide a moisture-proof case that can be easily applied or installed and the cable introduced thereinto without the necessity of cutting the wires in the said cable until they are needed for connection to wires in other cables entering the same case.

Another object of my invention is to provide a case which can be readily opened and closed for the purpose of connecting or disconnecting any of the wires entering the case in one or more cables.

Figure I is a longitudinal section of my case and showing insulated wires therein in elevation. Fig. II is a cross section taken on line II—II, Fig. I. Fig. III is a perspective view of the sectional washer used in my case.

A represents wires of electrical conducting wire cables and B the usual sheathing or armor confining the wires in series and which is preferably of lead.

1 designates a supporting ring, screw threaded internally and forming a part of or supported by any suitable means, such for instance as a bracket 2, by which it may be secured to a pole, the wall of a building or other object.

3 designates a sleeve provided with an external rim 4 and an internal ledge 5 located intermediate of its ends, the sleeve being screw threaded externally at both sides of its external rim. The inner end of said sleeve is fitted interiorly of the supporting ring 1.

6 designates a collar screw threaded internally at its inner end for engagement with the outer end of the sleeve 3. Sockets 7 are provided in the collar for the reception of a spanner to turn the collar in applying it to or removing it from the sleeve 3.

9 is an internal shoulder formed on the collar 6 intermediate of its ends.

12 designates a hood which may be fitted to the outer end of the collar 6 in any suitable manner. I prefer to secure it by sweating it to said collar.

14 designates a sectional washer, the sections of which are provided with matching recesses to receive the wire inclosing sheathings B. This washer is seated on the internal ledge 5 of the sleeve 3 and its utility will be hereinafter mentioned.

15 designates a gasket which is seated between the outer end of the sleeve 3 and the internal shoulder 9 of the collar 6 and serves to exclude any moisture from the interior of the hood 12.

In putting my moisture-proof case into condition for service the supporting ring 1 is suitably mounted upon a pole, wall of a building or other object that is to serve as a support therefor, the manner of mounting said supporting ring being preferably that of using the bracket 2 which is connected to the supporting object by screws, bolts or other suitable means. Previous to or after the mounting of the supporting ring 1 the sleeve 3 is set into said ring in such manner that its rim 4 rests upon the top of the ring while the sleeve is connected to the ring by the screw threads of said parts. The cables from portions of which the sheathing or armor is absent are then passed through the sleeve 3 in order that the exposed wires may extend beyond the outer end of the sleeve while the sheathings of the cables occupy the space within the sleeve and terminate beyond the outer end of said sleeve as illustrated in Fig. I. The cables may, as illustrated, terminate beyond the outer end of the sleeve, or they may be simply looped at this location to be cut at a later time when it may be desired to splice the wires of other cables thereto. After the cables have been positioned as stated, the sectional washer 14 is introduced into the sleeve 3 and deposited on the internal ledge 5 of said sleeve for the purpose of providing the bottom of a cup within the outer portion of the sleeve and through which the cable sheathings extend. Molten soft metal, such as solder is then introduced into the cup formed as stated, and as the sections of the washer 14 fit snugly to the sheathings of the cables due to the presence of the matching recesses in said sections, the molten metal is upheld and by hardening within the sleeve forms a solid body 16 around the cable sheathings that serves to effectually prevent the passage of moisture through the sleeve from its inner end to its outer end. The hood 12 of the case is then applied to the outer end of the sleeve 3 by threading the collar 6 by which it is carried onto said sleeve and screwing it tightly home, with the result of causing the hood to inclose the unsheathed wires of the cables to be protected and prevent the access of moisture thereto. For the purpose of affording security against the ingress of moisture to the interior of the hood through the joint between the collar of the hood and the sleeve to which said collar is fitted, the gasket 15 of rubber or other suitable material is interposed between the outer end of the sleeve and the shoulder 9 of the collar 6.

The various members of my moisture proof case may be constructed of any desirable material, metal being preferably used, and the hood 12 of the case being preferably of lead.

I claim:—

In a moisture-proof wire case, a bracket provided with a supporting ring screw-threaded internally, a sleeve screw-threaded externally at both of its ends and fitted at one end into said supporting ring and having intermediate of its screw-threads an external rim and interior thereof a ledge, a hood having screw-threaded connection with the end of said sleeve opposite that fitted to said supporting ring and adapted to rest on said external rim, and a sectional washer adapted to rest on said ledge and having its mating edges recessed, substantially as set forth.

A. L. JOYNES.

In presence of—
   H. F. SINGLETON,
   EARLE JOYNES.